(12) United States Patent
Baldwin

(10) Patent No.: US 8,569,620 B1
(45) Date of Patent: Oct. 29, 2013

(54) COLLAPSIBLE WHILE-IN-USE ELECTRICAL OUTLET COVER ASSEMBLY

(75) Inventor: Jeffrey P. Baldwin, Phoenix, AZ (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 13/231,898

(22) Filed: Sep. 13, 2011

Related U.S. Application Data

(63) Continuation of application No. 12/337,366, filed on Dec. 17, 2008, now Pat. No. 8,017,865, which is a continuation-in-part of application No. 12/169,058, filed on Jul. 8, 2008, now Pat. No. 7,554,037, and a continuation of application No. 11/422,583, filed on Jun. 6, 2006, now Pat. No. 7,396,996.

(60) Provisional application No. 61/014,153, filed on Dec. 17, 2007, provisional application No. 60/688,089, filed on Jun. 6, 2005.

(51) Int. Cl.
*H05K 5/03* (2006.01)

(52) U.S. Cl.
USPC ............ 174/66; 174/67; 174/53; 220/241; 220/242

(58) Field of Classification Search
USPC .............. 174/66, 67, 50, 53, 57, 58, 559; 220/3.2–3.9, 4.02, 241, 242; 248/906; 439/535, 536; D13/177; 200/333
See application file for complete search history.

(56) References Cited

U.S. PATENT DOCUMENTS

| | | | |
|---|---|---|---|
| 2,916,733 A * | 12/1959 | Hirsch | 174/67 |
| 4,634,015 A | 1/1987 | Taylor | |
| 5,931,325 A | 8/1999 | Filipov | |
| 7,038,131 B1 | 5/2006 | Gretz | |
| 7,259,328 B1 | 8/2007 | Gretz | |
| 7,276,661 B2 * | 10/2007 | Wegner et al. | 174/58 |
| 7,301,099 B1 * | 11/2007 | Korcz | 174/66 |
| 7,374,058 B2 | 5/2008 | Dinh et al. | |
| 7,431,594 B2 | 10/2008 | Castaldo et al. | |
| 7,495,170 B2 * | 2/2009 | Dinh et al. | 174/66 |
| 7,531,743 B2 | 5/2009 | Johnson et al. | |
| 7,554,037 B1 | 6/2009 | Shotey et al. | |
| 7,598,453 B1 * | 10/2009 | Shotey et al. | 174/66 |
| 8,017,865 B1 * | 9/2011 | Baldwin | 174/66 |
| 8,053,671 B1 * | 11/2011 | Shotey et al. | 174/67 |
| 8,076,577 B2 * | 12/2011 | Mango et al. | 174/66 |
| 2008/0210452 A1 | 9/2008 | Dinh et al. | |

* cited by examiner

*Primary Examiner* — Angel R Estrada
(74) *Attorney, Agent, or Firm* — Mark S. Bicks; Alfred N. Goodman

(57) ABSTRACT

An expandable while-in-use electrical outlet cover assembly comprising a lid operatively coupled to a base, the lid comprising flexible clips each comprising a first end, a mid-position and a second end. The collapsible lid may be held in an expanded position by the first end of the flexible clips and collapsed to a collapsed position by applying force to the lid such that a box-like cap slides with respect to a support ring such that the cap seats at the mid-portion of the flexible clip. Particularly useful for rigid lids, like metal lids, the collapsible cover protects the outlet beneath the cover while an electrical cord is plugged in, but still collapses to a smaller profile.

20 Claims, 4 Drawing Sheets

COLLAPSIBLE WHILE-IN-USE ELECTRICAL OUTLET COVER ASSEMBLY

CROSS REFERENCE TO RELATED APPLICATIONS

This document is a continuation of U.S. pending patent application Ser. No. 12/337,366, filed Dec. 17, 2008 to Shotey et al., entitled "Collapsible While-in-Use Electrical Outlet Cover Assembly," which is a continuation-in-part application of U.S. pending patent application Ser. No. 12/169,058, filed Jul. 8, 2008 to Shotey et al., entitled "Expandable In-Use Outlet Cover," which is a continuation of issued U.S. Pat. No. 7,396,996, filed Jun. 6, 2006 to Shotey et al., entitled "Expandable In-Use Outlet Cover," which claims priority to provisional patent application No. 60/688,089, filed Jun. 6, 2005 to Shotey et al., entitled "Expandable In-Use Outlet Cover," the disclosures of each of which is hereby incorporated herein by reference.

This document also claims the benefit of the filing dates of U.S. Provisional Patent Application Ser. No. 61/014,153 to Shotey, et al., entitled "Collapsible Metal While-in-Use Cover," filed Dec. 17, 2007, the disclosure of which is hereby incorporated herein by reference.

BACKGROUND

1. Technical Field

Aspects of this document relate generally to collapsible while-in-use electrical outlet covers.

2. Background Art

In-use outlet covers are those outlet covers that are configured to allow an electrical plug to be plugged into the outlet while a protective cover is closed. Having the cover closed while being used allows the cover to protect the outlet from the elements, such as rain, moisture and dust. Metal covers are generally used in areas where there is a risk of damage to the cover from heavy machinery crushing the cover.

Conventionally, to enable an electrical outlet cover to close while the outlet is in use, the base or lid of the cover unit needs to be adapted to be deep enough to allow for the lid to close without significant interference with the plug when the plug is inserted into the outlet. Some of the conventional approaches to accomplishing this deeper base are shown and described in U.S. Pat. No. 6,723,922 to Shotey et al. (Issued Apr. 20, 2004) titled "Universal cover plate", U.S. Pat. No. 6,133,531 to Hayduke (Issued Oct. 17, 2000) titled "Weatherproof outlet cover", U.S. Pat. No. 4,988,832 to Shotey et al. (Issued Jan. 29, 1991) titled "Recessed electrical outlet with cover", U.S. Pat. No. 4,803,307 to Shotey et al. (Issued Feb. 7, 1989) titled "Weatherproof outlet cover", the disclosures of each of which are hereby incorporated herein by reference for their general relevance to the formation and manufacture of cover assemblies.

Each of these designs involves a cover unit having a fixed dimension using what is typically called a bubble cover lid that bulges to allow room for the plug and cord within the cover when it is closed. One of the common complaints associated with conventional in-use cover designs is that the cover units protrude three or more inches from the exterior of the home, may be damaged or dislodged by passers-by, and are often unattractive on the home due to the size.

Typical base configurations for electrical devices include, but are not limited to, blank, duplex, decora, ground fault circuit interrupt (GFCI), round and switch. Examples of structures that may be used to enable a base member to be configured for conversion between various other configurations are shown and described in U.S. Pat. No. 6,723,922 to Shotey et al. (issued Apr. 20, 2004) titled "Universal cover plate", U.S. Pat. No. 6,987,225 to Shotey et al. (issued Jan. 17, 2006) titled "Convertible electrical device cover and method for installing same", U.S. Pat. No. 6,441,307 to Shotey et al. (issued Aug. 27, 2002) titled "Universal Cover Plate," and U.S. Pat. No. 6,770,816 to Shotey et al. (issued Aug. 3, 2004) titled "Convertible electrical device cover and method for installing same", the relevant disclosures of which are hereby incorporated herein by reference. Alternatively, as suggested in U.S. Pat. No. 6,770,816, the base member may be configured with an opening and attachment members and replaceable adapter plates may be used to enable the installer to select the desired base configuration. These references also include examples of removable cord escape tabs for vertical or horizontal orientations.

SUMMARY

Aspects of this document relate to while-in-use electrical outlet covers.

In one aspect, a while-in-use electrical outlet cover assembly comprises a collapsible lid operatively coupled to a base, the lid comprising a rigid cap having an internal volume and rigid sides and a rear opening defined by a rear edge, wherein the rear edge comprises an outwardly extending lip, the lid further comprising a support ring comprising four support sides each having an inner surface and a front edge comprising an inwardly extending lip. The lid may further comprise at least one flexible support clip coupled to the inner surface each of at least two of the support sides. The electrical device cover assembly collapses from a second depth to a first depth smaller than the second depth by the rigid cap sliding inside the support ring from the second depth where the outward extending lip of the rigid cap rests near an end of the flexible support clips to a first depth where the outwardly extending lip of the rigid cap rests at a mid-section of the flexible support clips.

Particular implementations may include one or more of the following. The base and/or lid may be formed primarily of metal or plastic. The flexible support clips may be formed primarily of metal and may even be spring steel support clips. The flexible support clips may be coupled to the inner surface of the at least two support sides by metal or plastic rivets. The lid may comprise at least one flexible support clip coupled to the inner surface each of at least three or four of the support sides, or even two flexible support clips coupled to the inner surfaces of each of the at least two support sides. The base may comprise at least one removable tab adapted such that removal of the at least one removable tab adapts the base from a base configured for a first electrical outlet style to a base configured for a second electrical outlet style different from the first style. The support ring may comprise a cord port extending through at least one of the support sides. The lid may be hingedly coupled to the base.

In another aspect, a while-in-use electrical outlet cover assembly comprises a metal base configured for attachment to an electrical outlet box and a lid hingedly coupled to the base. The lid may comprise a box-like metal cap nested inside a metal support ring, the metal support ring comprising a plurality of flexible metal clips coupled to an inner surface of the metal support ring at a first end of the metal clips. The flexible metal clips may each comprise a mid-section and a second end, wherein the lid comprises an expanded position where the metal cap is supported by the second end of each of the metal clips and a collapsed position where the metal cap contacts and is retained in the collapsed position at the midsection of the metal clips.

Particular implementations may include one or more of the following. The base and/or lid may be formed primarily of metal or plastic. The flexible support clips may be formed primarily of metal and may even be spring steel support clips. The flexible support clips may be coupled to the inner surface of the at least two support sides by metal or plastic rivets. The lid may comprise at least one flexible support clip coupled to the inner surface each of at least three or four of the support sides, or even two flexible support clips coupled to the inner surfaces of each of the at least two support sides. The base may comprise at least one removable tab adapted such that removal of the at least one removable tab adapts the base from a base configured for a first electrical outlet style to a base configured for a second electrical outlet style different from the first style. The support ring may comprise a cord port extending through at least one of the support sides. The lid may be hingedly coupled to the base.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

An electrical device mounting box assembly will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended electrical outlet cover assembly and/or methods for using an electrical outlet cover assembly will become apparent for use with implementations of electrical devices from this disclosure. Accordingly, for example, although particular electrical outlet cover assemblies, lids, bases, removable tabs, adapters, bias clips, attachment mechanisms, hinges, and cord ports are disclosed, such implementing components are not limited to those particular embodiments disclosed herein and may comprise any shape, size, style, type, model, version, measurement, concentration, material, quantity, and/or the like as is known in the art for such electrical outlet cover assemblies and implementing components consistent with the intended operation of an electrical outlet cover assembly.

Figure 1:
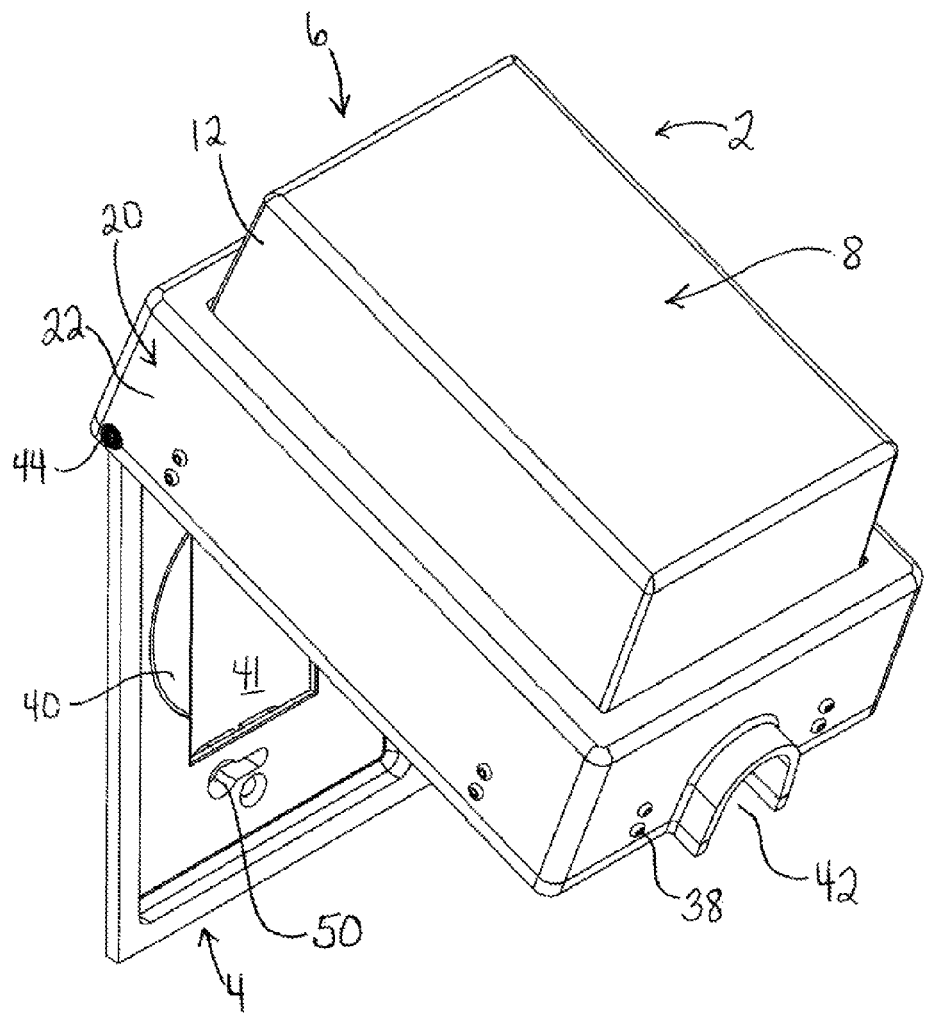
FIG. 1 is a front perspective view of one particular implementation of a while-in-use cover assembly for an electrical outlet in an open configuration.
Figure 2:
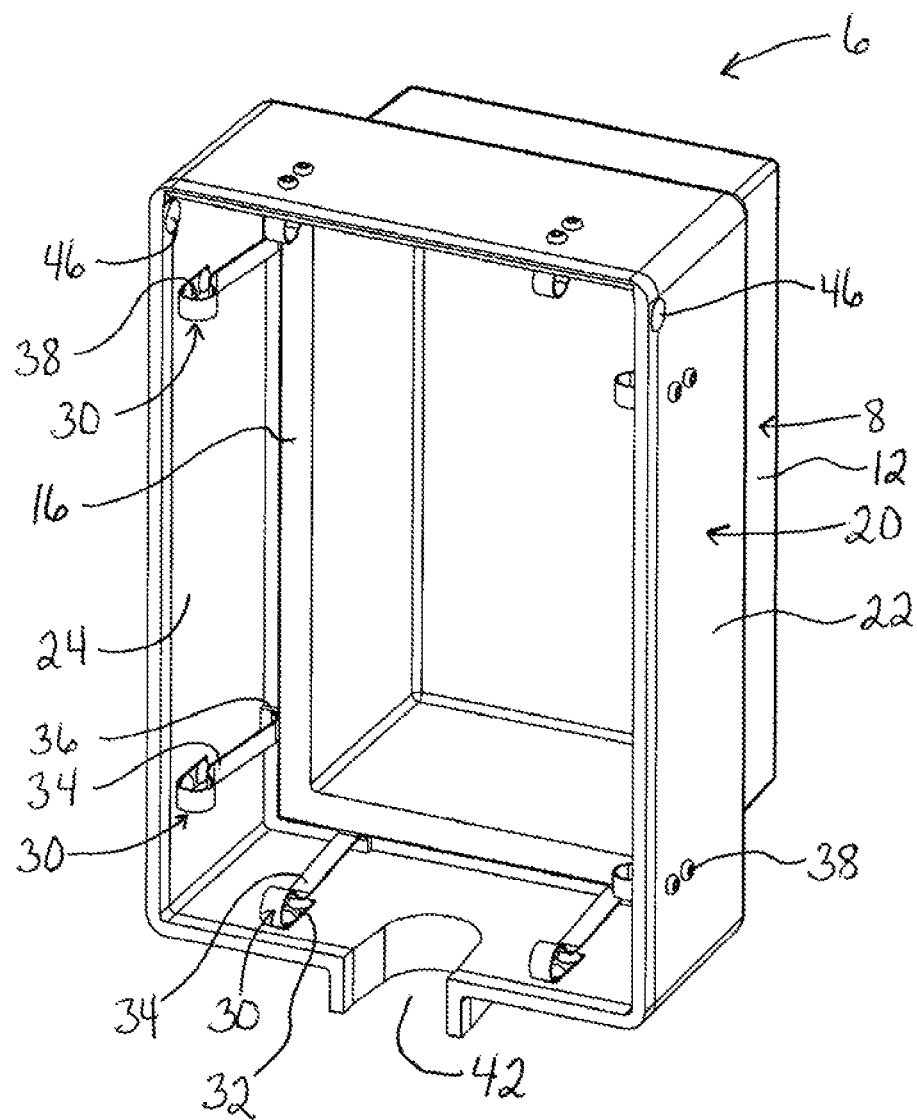
FIG. 2 is a rear perspective view of the lid of the particular implementation of FIG. 1 in an expanded position.
Figure 3:
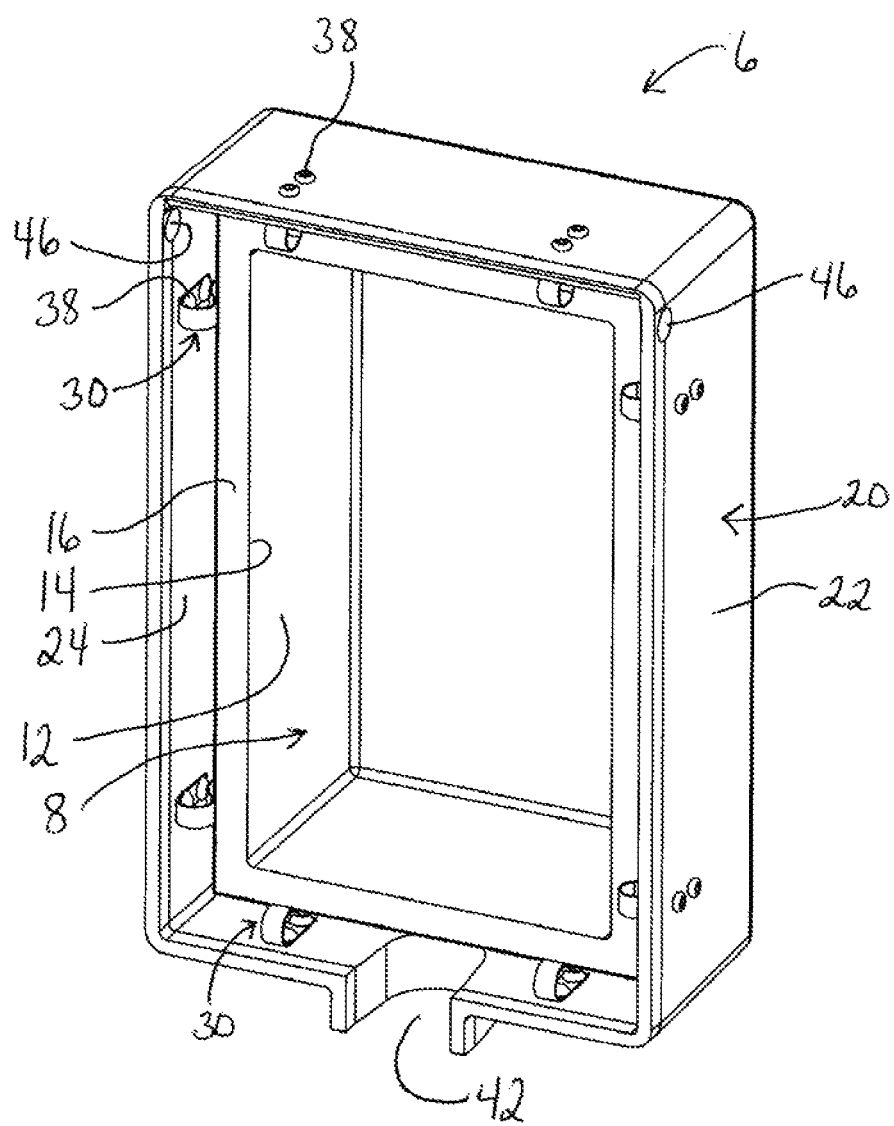
FIG. 3 is a rear perspective view of the lid of the particular implementation of FIG. 1 in a collapsed position.
Figure 5:
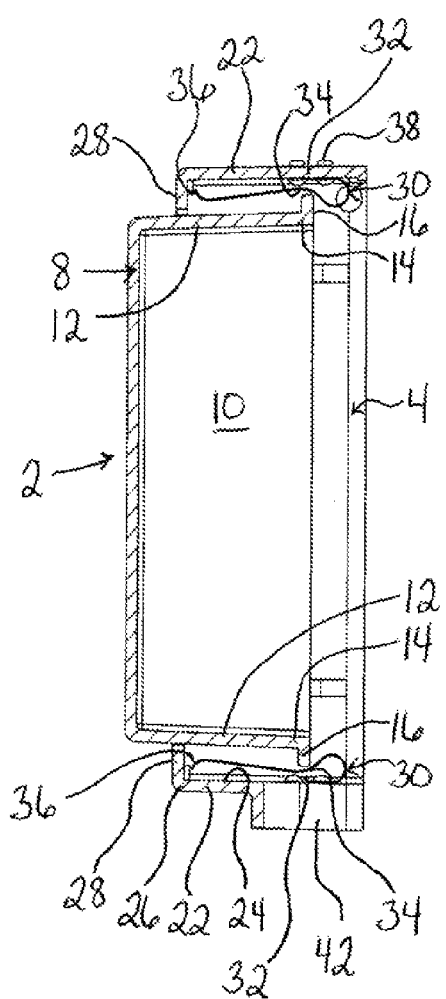
FIG. 5 is side sectional view of the particular implementation of the while-in-use cover assembly of FIG. 4 taken along section lines A-A.
Figure 4:
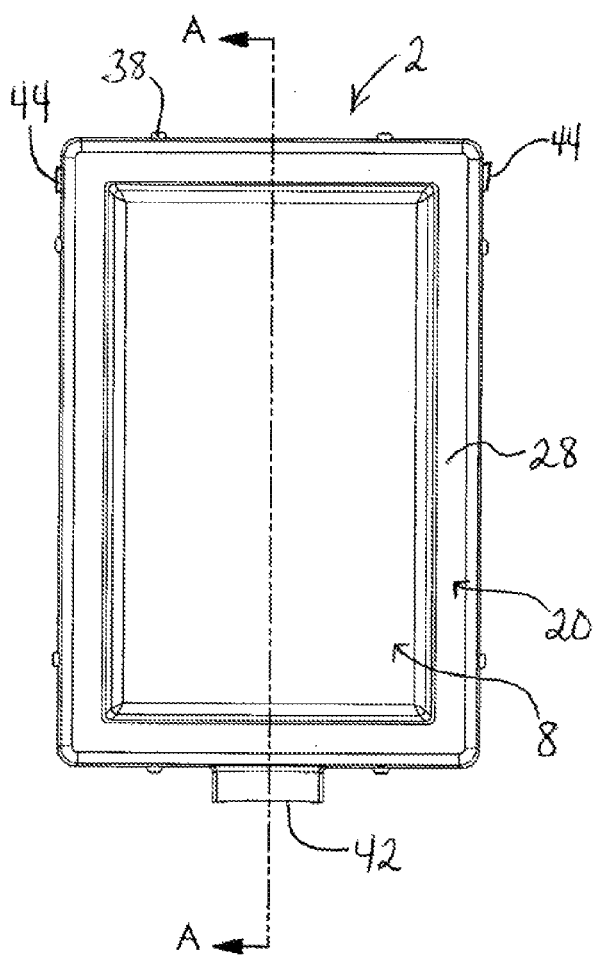
FIG. 4 is front view of the particular implementation of the while-in-use cover assembly of FIG. 1 in a collapsed position.

There are a variety of implementations of the electrical outlet cover assembly possible from the present disclosure. FIGS. 1-5 illustrate non-limiting example implementations of an electrical outlet cover assembly, but those of ordinary skill in the art will readily comprehend other particular implementations and variations from the disclosure provided in relation to this particular implementation. In this implementation the electrical outlet cover assembly is a while-in-use cover assembly. Although implementations may be made primarily of plastic or metal, the particular implementations shown in FIGS. 1-5 are particularly beneficial for use with a cover assembly formed primarily of metal.

Manufacture of metal while-in-use electrical device covers differ from that of plastic while-in-use electrical device covers for many reasons. One of those reasons is that metal is not pliable like plastic and, therefore, the parts made of metal that need to work together, need to be able to work together without having a pliable characteristic. Another reason metal manufacture is different from plastic is that metal is heavier than plastic. This affects the working relationships between the parts made of metal in much different ways than the parts made of plastic.

There are many aspects of a while in-use electrical outlet cover assembly 2 disclosed herein, of which one, a plurality, or all aspects may be used in any particular implementation.

The particular implementation shown includes a base 4 configured for attachment to an electrical outlet box mounted in a wall. A lid 6 is operably coupled to the base. The lid 6 comprises a box-like cap 8 that is rigid, formed of either plastic or metal, the lid 6 comprising an internal volume 10 and rigid sides 12 with a rear opening defined by a rear edge 14. An outwardly extending lip 16 extends outwardly from the rear edge 14 of the rigid cap 8. The lid further comprises a support ring 20 comprising support sides 22 each having an inner surface 24 and a front edge 26 with an inwardly extending lip 28. The rigid cap 8 is nested inside the support ring 20. A plurality of flexible support clips 30 is each coupled to an inner surface 24 of a support side 22. The lid 6 is hingedly coupled to the base through the support ring 20. In the particular implementation of FIG. 1, the base comprises a pair of pins 44 extending from opposing sides of the base 4 that mate with corresponding sockets 46 on or through the support ring 20. Although a particular hinge configuration is used in this particular implementations shown in FIGS. 1-5, the particular hinge configuration is not crucial to the operation of the cover assembly and other hinge configurations are contemplated and anticipated for use to couple the base 6 to the support ring 20.

Although this particular implementation includes only three pieces (the base 4, the support ring 20 and the cap 6), additional pieces may be included within particular implementations to allow for greater expansion/collapsing capabilities. For example, additional support rings may be included between the primary support ring 20 and the cap 6 to allow for the same distance of expansion with a smaller collapsible size, or for a greater distance of expansion.

During the use of a typical while-in-use cover, for example when a user plugs an electrical cord cap into a receptacle on to which the cover assembly 2 is installed, it is desirable for the lid 6 to be able to close on the base 4 with the plug plugged into the receptacle to keep water from the receptacle. However, it is also desirable for the cord to not be bent at too tight of an angle to avoid damaging the cord. In contrast, it is also desirable to make the while-in-use cover 2 less visible when the receptacle is not in use. For plastic covers, this problem has been overcome with differently structured solutions. However, for metal covers, prior to this disclosure no known solution has been found to enable a low profile metal cover.

To maintain the weatherproof nature of a collapsible weatherproof cover, such as that shown in FIGS. 1-5, it is desirable to keep the cap 8 fully extended while the cover 2 is in use. The additional weight and non-flexibility of a metal cover makes the earlier solutions used for plastic collapsible covers less effective or unavailable.

For the particular implementation shown in FIGS. 1-5, the cap 8 comprises an outwardly extending lip 16 around its periphery at its open end that contacts a corresponding inwardly extending lip 28 around the periphery of the support ring 20 when the cap 8 is moved to its expanded position. The plurality of flexible support clips 30 (made from a resilient material such as spring steel or a durable plastic) coupled to an inside surface 24 of the support ring 20 maintain the cap 8 in its expanded position. The flexible support clips 30 in the particular implementation shown each include a first end 32, a mid-section 34 and a second end 36. The flexible support clips are each coupled to the inner surface 24 of the support sides 22 by at least one attachment mechanism 38. The attachment mechanism 38 may comprise a metal or plastic rivet, or an adhesive or may even be welded to the support sides 22 depending upon the particular materials being used and the forces to which the flexible support clips 30 will be exposed. When the cap 8 is in its expanded position, the outwardly extending lip 16 of the cap is supported by the second end 36 of the flexible support clips 30.

When force is applied to the cap 8 to collapse the cap 8, the outwardly extending lip 16 presses against the curved second ends 36 of the flexible support clips 30 and they collapse out of the way toward the inner surface 24 of the support sides 22, allowing the outwardly extending lip 16 to move to and snap into position at the respective mid-sections 34 of the flexible support clips 30. When it reaches the mid-sections 34 of the flexible support clips 30, the outwardly extending lip 16 of the cap 8 rests in this collapsed position until a force acts on the cap 8 to expand it to its expanded position, where the flexible support clips 30 collapse toward the support sides 22 to again allow the outwardly extending lip 16 of the cap 8 to pass and snap into the expanded position and be supported by the respective second ends 36 of the flexible support clips 30. One particular advantage from using spring steel spring elements is that the surface of the flexible support clip comprises a bearing surface that will not prematurely wear out. Nevertheless, other components such as cast parts-on-cast parts sliding relative to each other may also accomplish the same function intended here.

The particular implementations shown in FIGS. 1-5 illustrate two flexible support clips 30 on each side of the support ring 20. However as few as only two flexible support clips 30 on opposing sides of the support ring 20 may be used. In another particular implementation, three flexible support clips 30, one on each of three adjacent sides, may be used. In yet another particular implementation, four flexible support clips 30, one on each side of the support ring 20, are used. In still yet other implementations, two or more flexible support clips are used on each side of the support ring 20 on which flexible support clips are used.

Although no latch element is shown in FIGS. 1-5, it is contemplated that a latch element as is known in the art of metal or plastic while-in-use covers may be included in the present implementations of a while-in-use cover. Those of ordinary skill in the art will readily understand how to adapt the particular designs discussed to include an appropriate latch element.

In particular implementations of the base 4, the base may comprise at least one removable tab 40 adapted such that the electrical outlet aperture 41 in the base 4 may be converted from being configured for a first electrical outlet type, such as a decora or ground fault current interrupter (GFCI) type, to being configured for a second electrical outlet type, such as a round type. Alternatively, the base may be configured for conversion from a duplex to a decora, GFCI or round type as well. Additional adapters may be added as well to further enable the base to be reconfigured for other outlet types. The base 4 is adapted for mounting to an electrical outlet box in a wall through box mounting screw apertures 50 positioned to align with the electrical outlet box mounting screws when mounted.

The particular implementation illustrated in FIGS. 1-5 also includes a cord port 42 extending through at least one of the support sides 22 of the support ring 20. Alternatively, the cord port 42 may be arranged to extend through more than one support side 22 by including multiple cord ports 42 on adjacent sides or one cord port 42 on a corner of the support ring 20.

A while in-use cover assembly with a lid may additionally include supplemental weatherproofing (not shown) which can also protect an electrical device from weather while collapsed, extended, and partially extended. For example, one or more additional gaskets in locations such as on the back of the base and on the support ring lip 28 and/or the cap lip 16 may also assist in reducing the likelihood that water will pass to inside the collapsible while-in-use cover assembly 2 in any significant amount. It is specifically contemplated that a while in-use electrical outlet cover assembly may encompass a cover and/or base of any size, shape, profile, configuration or dimension.

The concepts disclosed herein are not limited to the specific implementations shown herein. For example, it is specifically contemplated that the components included in a particular implementation of an electrical outlet cover assembly may be formed of any of many different types of materials or combinations that can readily be formed into shaped objects and that are consistent with the intended operation of an electrical outlet cover assembly. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the electrical outlet cover assemblies, lids, bases, removable tabs, adapters, bias clips, attachment mechanisms, hinges, cord ports, and electrical devices, and any other components forming a particular implementation of an electrical outlet cover assembly may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical outlet cover assembly, it should be readily apparent that a number of modifications may be made without departing from the spirit thereof and that these implementations may be applied to other electrical outlet cover assemblies. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A collapsible while-in-use electrical outlet cover assembly, comprising:
 a base configured for attachment to an electrical outlet box;
 a support ring hingedly coupled to the base, the support ring comprising a plurality of support walls and an inwardly extending lip surrounding a ring opening;
 a cap comprising a capped face, a plurality of sides and an outwardly extending lip opposite the capped face, the plurality of sides extending through the ring opening such that at least a portion of the plurality of sides and the outwardly facing lip are within the support ring and the interaction of the outwardly facing lip and the inwardly facing lip secure the cap within the support ring.

2. The collapsible while-in-use electrical outlet cover assembly of claim 1, further comprising at least one support clip coupled to an inner surface of each of the plurality of support walls.

3. The collapsible while-in-use electrical outlet cover assembly of claim 2, wherein the at least one support clip comprises a flexible support clip comprising a first end, a mid-section, and a curved second end.

4. The collapsible while-in-use electrical outlet cover assembly of claim 3, wherein the outwardly facing lip rests at the mid-section of the support clip to form a first depth of the electrical device cover assembly or the outwardly facing lip rests near the curved second end of the support clip to form a second depth larger than the first depth.

5. The collapsible while-in-use electrical outlet cover assembly of claim 1, wherein the base, the support ring, and the cap are formed primarily of metal.

6. The collapsible while-in-use electrical outlet cover assembly of claim 3, wherein the support clips are formed primarily of metal.

7. The collapsible while-in-use electrical outlet cover assembly of claim 1, wherein the support ring comprises a cord port extending through at least one of the support sides.

8. A collapsible while-in-use electrical outlet cover assembly, comprising:
 a base configured for attachment to an electrical outlet box; and
 a lid operably coupled to the base, the lid comprising:
  a cap having a plurality of sides and a rear opening defined by a rear edge, wherein the rear edge comprises an outwardly extending lip;
  a support ring comprising a plurality of support sides each having an inner surface and a front edge comprising an inwardly extending lip;
 wherein the electrical device cover assembly expands from a first depth to a second depth larger than the first depth by the cap sliding inside the support ring from the first depth where the outwardly extending lip of the rigid cap rests near the base to a second depth where the outward extending lip of the rigid cap rests near the inwardly extending lip.

9. The collapsible while-in-use electrical outlet cover assembly of claim 8, wherein the cap comprises a rigid cap having an internal volume and the plurality of sides comprise a plurality of rigid sides.

10. The collapsible while-in-use electrical outlet cover assembly of claim 9 further comprising at least one flexible support clip coupled to the inner surface each of the plurality of support sides.

11. The collapsible while-in-use electrical outlet cover assembly of claim 10, wherein the outwardly facing lip rests at a mid-section of the support clip to form a first depth of the electrical device cover assembly or the outwardly facing lip rests near a curved second end of the support clip to form a second depth larger than the first depth.

12. The collapsible while-in-use electrical outlet cover assembly of claim 8, wherein the base, the support ring, and the cap are formed primarily of metal.

13. The collapsible while-in-use electrical outlet cover assembly of claim 10, wherein the support clips are formed primarily of metal.

14. The collapsible while-in-use electrical outlet cover assembly of claim 8, wherein the support ring comprises a cord port extending through at least one of the support sides.

15. A collapsible while-in-use electrical outlet cover assembly, comprising:
 a base;
 a hollow support ring coupled to the base and comprising an interior surface, an exterior surface, and an inwardly facing lip on the interior surface of the support ring; and
 a cap comprising a capped end, a lipped end comprising an outwardly facing lip opposite the capped end, and a plurality of rigid sides extending between the capped end and the lipped, wherein the outwardly facing lip is configured to slide within the interior surface of the support ring between the base and the inwardly facing lip when the rigid sides are positioned within the support ring.

16. The collapsible while-in-use electrical outlet cover assembly of claim 15, further comprising a plurality of flexible clips coupled at a first end to the interior surface of the support ring between the inwardly facing lip and the base.

17. The collapsible while-in-use electrical outlet cover assembly of claim 16, wherein each of the plurality of clips comprises a mid-section and a curved second end.

18. The collapsible while-in-use electrical outlet cover assembly of claim 17, wherein the outwardly facing lip rests at the mid-section of the support clip to form a first depth of the electrical device cover assembly or the outwardly facing lip rests near the curved second end of the support clip to form a second depth larger than the first depth.

19. The collapsible while-in-use electrical outlet cover assembly of claim 15, wherein the base, the support ring, and the cap are formed primarily of metal.

20. The collapsible while-in-use electrical outlet cover assembly of claim 16, wherein the support clips are formed primarily of metal.

* * * * *